United States Patent
Heinrich et al.

[15] 3,697,850
[45] Oct. 10, 1972

[54] BATTERY CHARGER CONNECTED IN SERIES WITH AN ALTERNATING CURRENT LOAD CIRCUIT VIA A RECTIFIER

[72] Inventors: Theodore M. Heinrich, Murrysville, Pa.; Robert L. Martin, Excelsior, Minn.; David J. Steele, Harlow, England

[73] Assignee: Westinghouse Electric Corporation, Pittsburgh, Pa.

[22] Filed: Dec. 31, 1970

[21] Appl. No.: 103,100

[52] U.S. Cl. .................320/39, 320/59, 317/33
[51] Int. Cl. .................................H02j 7/10
[58] Field of Search............320/2, 11, 39, 40, 27, 28, 320/59–61, 31, 32; 322/91, 28; 317/33 SC

[56] References Cited

UNITED STATES PATENTS

| | | | |
|---|---|---|---|
| 3,341,763 | 9/1967 | Noddin | 317/33 X |
| 3,456,182 | 7/1969 | Cummins et al. | 322/91 X |
| 3,373,341 | 3/1968 | Wattson | 317/33 X |
| 3,374,420 | 3/1968 | Weber, Jr. | 317/33 X |
| 3,099,782 | 7/1963 | Smith, Jr. | 320/39 |
| 3,475,653 | 10/1969 | Odenberg et al | 320/40 UX |
| 3,353,066 | 11/1967 | De Souza | 317/33 X |

Primary Examiner—J. D. Miller
Assistant Examiner—Robert J. Hickey
Attorney—A. T. Stratton, F. E. Browder and Donald R. Lackey

[57] ABSTRACT

A battery charger which receives energy for replenishing and maintaining a charge on a battery, from an alternating current source which may vary in voltage and frequency. The battery charger connects the battery in series with the alternating current source and its alternating current load via a rectifier, with the load current being shunted away from the battery when the charging current requirements of the battery are satisfied.

6 Claims, 2 Drawing Figures

3,697,850

PATENTED OCT 10 1972

INVENTORS
Robert L. Martin,
Theodore M. Heinrich &
David J. Steele

Donald R. Lackey
ATTORNEY

BATTERY CHARGER CONNECTED IN SERIES WITH AN ALTERNATING CURRENT LOAD CIRCUIT VIA A RECTIFIER

BACKGROUND OF THE INVENTION

1. Field of the Invention

The invention relates in general to battery charger apparatus, and more specifically to battery charger apparatus suitable for applications such as transportable refrigeration systems, electrical power system distribution centers, and substations.

2. Description of the Prior Art

A refrigeration system comprises a compressor driven by an internal combustion engine, or an electric motor, depending upon the application, at speeds and/or intervals responsive to the cooling requirement of the system. The system commonly includes fan motors which are energized either from an alternating current generator driven by the engine, or from an alternating current source, in the event an electric motor is used to drive the compressor. These systems include a battery for cranking the engine, when used, or for control power in other applications. When the compressor is driven by an engine, a separate regulated generator, driven by the engine, is usually provided for charging the battery.

U.S. Pat. No. 1,691,095 discloses the charging of a storage battery by connecting the battery in series with a direct current generator and its load, thus charging the battery even though the output voltage of the direct current generator may be much greater than the battery voltage. It is desirable to be able to charge the storage battery from a voltage source which may be much greater than the battery voltage, as disclosed in the hereinbefore mentioned patent, but it would also be desirable to charge the battery when a direct current generator is not provided, i.e., when only alternating current load current flows or is available. It would also be desirable to charge the battery when the normal level of load current is too large for charging purposes, and to divert current in excess of the battery requirements away from the battery and charger system without wasting energy.

SUMMARY OF THE INVENTION

Briefly, the present invention is a new and improved battery charger which is operable directly from a source of alternating current which may vary in voltage and frequency. A rectifier bridge assembly having a plurality of diodes connects the battery in series with the alternating current load, thus effectively connecting the battery to a constant current source. Solid state switching devices are connected to shunt the load current from the battery, in cooperation with certain of the diodes of the rectifier bridge assembly, when the battery voltage reaches a predetermined magnitude, in response to a signal provided by sensing means connected to be responsive to the battery voltage. The remaining diodes of the bridge rectifier assembly are reverse biased by the battery when the load current is being shunted, blocking current flow through the battery.

In the event of a short circuit in the alternating current load circuit when the battery is charged, protective means terminates the shunting of the load current through the solid state switching devices, forcing the overload current to flow through the battery, which is capable of handling it without damage. Thus, the solid state switching devices may be selected to carry only normal load current, as they are protected against overload.

Protective means is also provided to prevent damage to components due to excessive voltages which may develop if the battery is disconnected from the battery charger for some reason. This protective means provides switching signals for the solid state switching devices when the voltage across the output terminals of the rectifier bridge reaches a predetermined magnitude, thus providing a clamp on the circuit voltage.

Since the battery charger is operable directly from an alternating current source, transformers may be used to provide current magnitudes in the range required by the battery.

BRIEF DESCRIPTION OF THE DRAWING

The invention may be more readily understood when considered in view of the following detailed description of exemplary embodiments thereof, taken with the accompanying drawings, in which.

DESCRIPTION OF PREFERRED EMBODIMENTS

Figure 1:
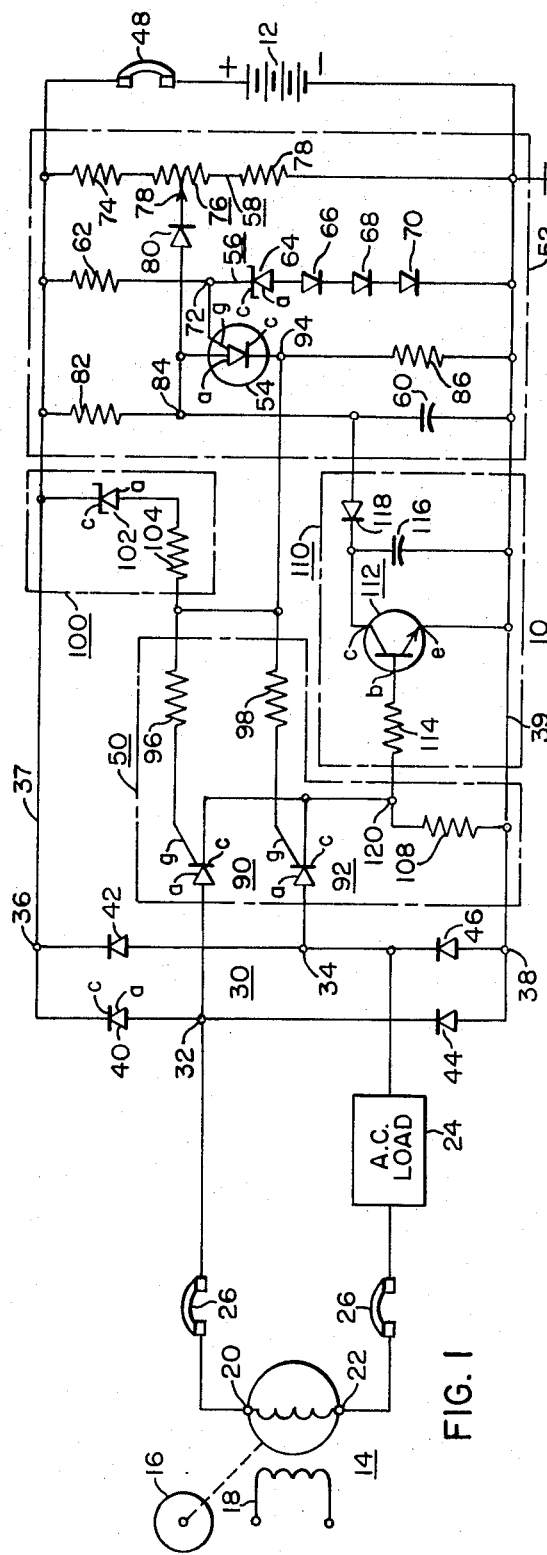
FIG. 1 is a schematic diagram of battery charger apparatus constructed according to the teachings of the invention, operating from a single-phase alternating current generator.

Referring now to the drawings, and FIG. 1 in particular, there is shown a battery charger 10 constructed according to the teachings of the invention, for charging a battery 12 from a single!-phase source of alternating current such as generator 14, which source may vary in output frequency and output voltage.

Alternating current generator 14, which may be driven by an internal combustion engine indicated generally at 16, or by an electric motor, depending upon the application, includes a field excitation winding 18 and alternating current output terminals 20 and 22. While the battery charger 10 is applicable to industrial and other electrical substations which require a battery for central power, it will be described for use with a transportable refrigeration system. Generator 14 provides an alternating current output voltage which, in most applications, is about 10 times the rated output voltage of the battery. Output terminals 20 and 22 of generator 14 are connected to an alternating current load circuit 24, via a circuit breaker 26. Circuit breaker 26 is set to trip upon a predetermined overload current. Load circuit 24 includes the compressor and fan motors of the refrigeration system, with the speed at which generator 14 is driven by engine 16 being responsive to the cooling requirements of the refrigeration system.

The load current supplied by the generator 14 is relatively constant and the battery 12 is charged from the variable frequency, variable voltage alternating current generator by effectively connecting the battery 12 in series with the load circuit. The battery 12 receives a substantially constant charging current without appreciably disturbing the alternating current load 24.

The battery 12 is connected in series with the alternating current generator 14 and load circuit 24 via rectifier means 30, which in this instance is a single-phase bridge rectifier having alternating current input terminals 32 and 34, unidirectional current output terminals 36 and 38, and diodes 40, 42, 44 and 46. Diodes 40 and 42 have their cathode electrodes $c$ connected to output terminals 36, and their anode electrodes $a$ are connected to input terminals 32 and 34, respectively. Diodes 44 and 46 have their cathode electrodes $c$ connected to the input terminals 32 and 34, respectively, and their anode electrodes $a$ are connected to output terminal 38.

Input terminal 32 of rectifier means 30 is connected to output terminal 20 of generator 14, and input terminal 34 of rectifier means 30 is connected to output terminal 22 of generator 14 via the AC load circuit 24. Output terminals 36 and 38 of rectifier means 30 are connected to the positive and negative terminals of battery 12 via conductors 37 and 39, respectively, and a direct current circuit breaker 48. Circuit breaker 48 protects the battery charger 10 from inadvertent misconnection of the battery 12 to the battery charger 10.

When the battery 12 is fully charged, the load current of the alternating current generator 14 is shunted away from battery 12 by switching means 50. The fully charged condition of battery 12 is sensed by sensing means 52, which provides switching or gating signals for switching means 50 when the output voltage of battery 12 reaches a predetermined magnitude.

Sensing means 52 includes a solid state switching device, which in this instance is a programmable unijunction transistor 54, having anode, cathode and gate electrodes $a$, $c$ and $g$, respectively. Sensing means 52 also includes a first voltage divider 56 connected across the battery 12 to provide a constant reference voltage for the gate electrode $g$ of the programmable unijunction transistor 54, a second voltage divider 58 which provides a measure of the voltage across the battery for the anode electrode $a$ of the programmable unijunction transistor 54, and a capacitor 60.

The first voltage divider 56 includes a resistor 62, an avalanche or voltage regulating diode 64, and a plurality of diodes for providing the desired temperature compensation, such as semiconductor silicon diodes 66, 68 and 70. The resistor 62, the avalanche diode 64 and diodes 66, 68 and 70 are serially connected between conductors 37 and 39, with the avalanche diode 64 being poled to block current flow from conductor 37 to conductor 39 until its reverse breakdown voltage is exceeded. Diodes 66, 68 and 70 are poled to conduct current from conductor 37 to conductor 39, with a voltage drop responsive to temperature. Thus, the voltage appearing at the junction 72 between resistor 62 and the cathode electrode $c$ of the avalanche diode 64 is constant, except as modified by temperature, and is used as a reference voltage for the gate electrode $g$ of the programmable unijunction transistor 54.

The second voltage divider 58 includes a plurality of resistors, such as resistors 74, 76 and 78, which are serially connected between conductors 37 and 39. Resistor 76 may be adjustable, if desired, having a movable arm 79. The anode electrode $a$ of the programmable unijunction transistor 54 is connected to the adjustable arm 79 of resistor 76, via a blocking diode 80 poled to conduct current from the anode electrode $a$ to the adjustable arm 79.

Capacitor 60 and resistor 82 are serially connected between conductors 37 and 39, with the junction 84 between capacitor 60 and resistor 82 being connected to the anode electrode $a$ of the programmable unijunction transistor 54. The sensing circuit 52 is completed by connecting the cathode electrode $c$ of the programmable unijunction transistor 54 to conductor 39, via resistor 86.

The programmable unijunction transistor 54 blocks current flow from its anode to its cathode electrodes until its anode electrode becomes more positive than its gate electrode. Thus, as long as the reference voltage appearing at junction 72 exceeds the voltage at the adjustable arm 79 of resistor 76, the load current provided by the alternating current generator 14 will flow through battery 12. When the output or terminal voltage of battery 12 reaches its fully charged level, the voltage at the adjustable arm 79 of resistor 76 will exceed the reference voltage at junction 72, and the programmable unijunction transistor 54 will become conductive. When the programmable unijunction transistor 54 becomes conductive, capacitor 60, which has previously charged through resistor 82, discharges through the programable unijunction transistor 54 and through resistor 86. The voltage across resistor 86 is used to gate the switching means 50.

Capacitor 60 provides the high energy pulse required to gate the switching means 50, and by properly selecting the values of resistor 82, capacitor 60 and resistor 86, a pulse train having a high repetition rate may be provided for gating purposes.

Since the load current may be relatively high, the solid state switching means preferably includes thyristors or semiconductor controlled rectifiers, such as controlled rectifiers 90 and 92, each having anode, cathode and gate electrodes. The anode electrodes $a$ of controlled rectifiers 90 and 92 are connected to the alternating current input terminals 32 and 34, respectively, of rectifier means 30, and their cathode electrodes are connected to conductor 39. The gate electrodes $g$ are connected to be responsive to the voltage across resistor 86, and may be connected to the junction 94 between resistor 86 and the programmable unijunction transistor 54, via current dividing resistors 96 and 98, respectively.

In the operation of the battery charger 10, the battery 12 is charged by the load current of the alternating current generator 14 until the voltage at the adjustable arm 79 of resistor 76 exceeds the reference voltage applied to the anode electrode $a$ of the programmable unijunction transistor 54. When this occurs, gating pulses are provided which are applied to controlled rectifiers, 90 and 92, switching them to their conductive states, and connecting input terminals 32 and 34 to conductor 39. When input terminals 32 and 34 are connected to conductor 39, diodes 40 and 42 are back biased by the battery 12. Thus, the load current flows through controlled rectifier 92 and diode 44 on one half cycle of the source potential, and then through controlled rectifier 90 and diode 46 on the next half cycle, shunting the load current away from the battery 12. Therefore, a low voltage DC circuit has been effectively connected in series with a high voltage constant current AC circuit, to obtain a substantially constant current in the low voltage DC circuit, with shunting means for shunting the current away from the low voltage DC circuit when the voltage of the DC circuit reaches a predetermined magnitude.

In the event the battery 12 is disconnected from the battery charger 10 for some reason, the components of the battery charger 10, and the remainder of the DC system load, are protected from overvoltage by a first protective circuit 100. The first protective circuit 100 senses the voltage across conductors 37 and 39 and provides gating signals for switching means 50 when the voltage reaches a magnitude which is still compatible with the component ratings and the direct current system voltage rating.

Protective circuit 100 includes an avalanche or voltage regulating diode 102 and a resistor 104, which are serially connected from conductor 37 to junction 94, and thus to conductor 39 via resistor 86. When the voltage across the avalanche diode 102 exceeds its reverse breakdown rating, it conducts and provides gate drive for controlled rectifiers 90 and 92, clamping the voltage across conductors 37 and 39 to a predetermined maximum value.

The battery charger 10 is inherently protected against a short circuit across conductors 37 and 39, because of the constant current characteristics of the alternating current supply, but a short circuit in the AC generator or in the AC load will cause fault current to flow through controlled rectifiers 90 and 92 if the battery 12 is charged. While controlled rectifiers 90 and 92 may be selected to carry the fault current, it would be more desirable, from an economic viewpoint, to direct the fault current through the battery 12 when it occurs, which may easily withstand it, allowing the selection of smaller, lower cost controlled rectifiers for the switching means 50. This objective is accomplished by connecting the controlled rectifiers 90 and 92 to conductor 39 through a resistor 108, and sensing the voltage drop across resistor 108 with a second protective circuit 110.

Protective circuit 110 includes switching means for dropping or clamping the anode voltage of the programmable unijunction transistor 54 to a value which prevents it from providing gating signals for firing means 50, with the switching means of the protective circuit 110 being responsive to a predetermined voltage drop across resistor 108. Thus, fault current will be transferred from the controlled rectifiers 90 and 92 to the battery 12. As illustrated, the switching means of the protective circuit 110 may be an NPN transistor 112 having base, collector and emitter electrodes $b$, $c$ and $e$, respectively, a resistor 114, a capacitor 116, and a diode 118. The base-emitter junction of transistor 112 is connected to be responsive to the voltage drop across reistor 108, by connecting the base electrode $b$ of transistor 112 to the junction 120 between resistor 108 and the controlled rectifiers 90 and 92, via biasing resistor 114, and its emitter electrode $e$ to conductor 39. Capacitor 116 is connected across the collector-emitter electrodes of transistor 112, and the collector electrode $c$ is connected to junction 84, and thus to the anode electrode $a$ of the programmable unijunction transistor 54, via diode 118. Diode 118 is poled to conduct current from the anode electrode $a$ of the programmable unijunction transistor 54 to the collector electrode $c$ of transistor 112.

When the voltage drop across resistor 108 becomes large enough to switch transistor 112 to its conductive state, indicating the current flow has reached the maximum desirable magnitude for the controlled rectifiers 90 and 92, the anode electrode $a$ of the programmable unijunction transistor 54 is clamped to the voltage of conductor 39. The programmable unijunction transistor 54 therefore ceases to provide gating pulses for switching means 50, controlled rectifiers 90 and 92 become non-conductive, shifting the fault current to the battery 12, and transistor 112 loses base drive and switches back to its non-conductive state. The anode voltage of the programmable unijunction transistor 54, however, does not immediately rise when transistor 112 becomes non-conductive, but increases according to the time constant of the RC circuit which includes resistor 82 and capacitor 116. The RC time constant of this circuit is selected to prevent the programmable unijunction transistor from delivering firing pulses until the circuit breaker 26 has had time to operate in response to the overload condition. If the circuit breaker 26 does not operate for some reason, the programmable unijunction transistor 54 will again deliver pulses when the voltage applied to its anode electrode $a$ exceeds the voltage applied to its gate electrode $g$. Controlled rectifiers 90 and 92 will again be gated to their conductive state, diverting the fault current from the battery, transistor 112 will become conductive due to the voltage drop across resistor 108, and the anode electrode $a$ of the programmable unijunction transistor 54 will once again be clamped to a low voltage, until capacitor 116 recharges. This possibility of cycling the current back and forth between the battery and the controlled rectifiers during a fault on the alternating current generator 14 is not objectionable, however, as the controlled rectifiers are able to withstand high currents for short periods of time.

Figure 2:
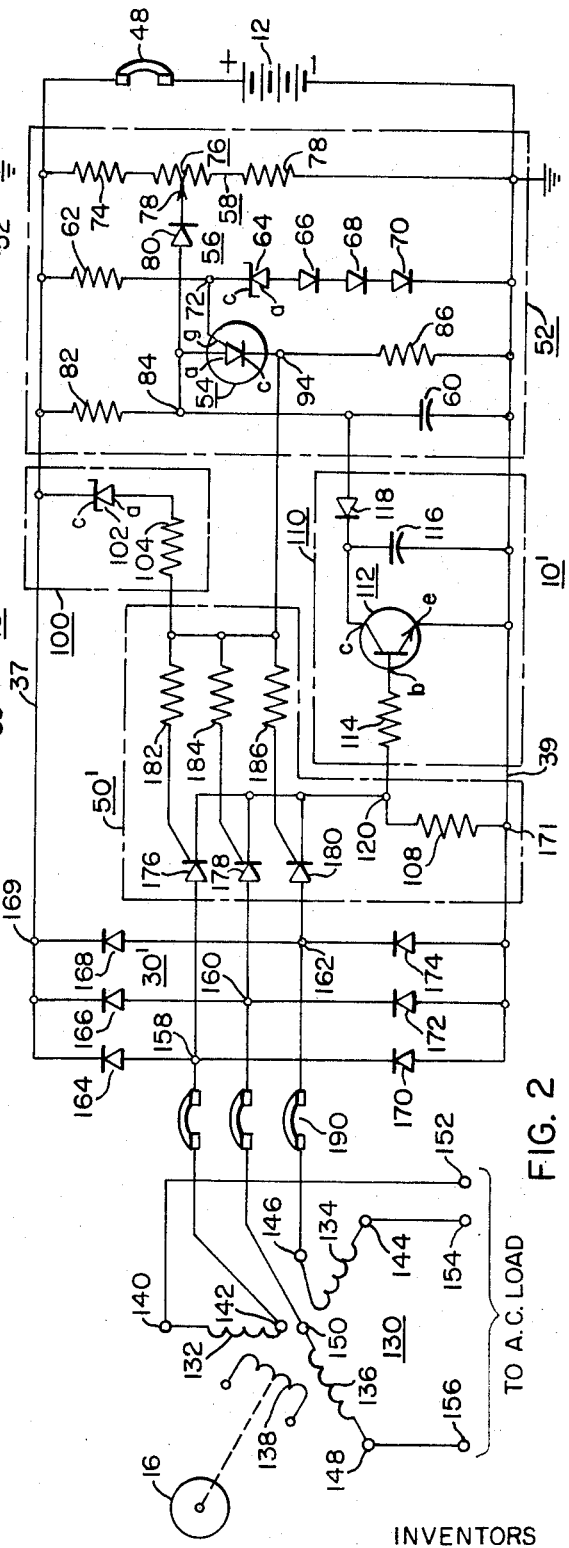
FIG. 2 is a schematic diagram of battery charger apparatus constructed according to the teachings of the invention, operating from a three-phase alternating current generator.

While the battery charger 10 has been described relative to FIG. 1 as operating with a single-phase alternating current generator 14, it will operate with equal facility with a three-phase alternating current generator, with only slight modification. This embodiment of the invention is shown in FIG. 2. Like reference numerals in FIGS. 1 and 2 indicate like components, while like reference numerals except for a prime mark indicate similar but modified components or functions.

More specifically, FIG. 2 illustrates a battery charger 10' constructed according to the teachings of the invention, which operates from a three-phase alternating current generator 130 having first, second and third phase windings 132, 134 and 136, and a field excitation winding 138. Each of the phase windings have an output end and a neutral end, with phase winding 132 having an output end 140 and a neutral end 142, phase winding 134 having an output end 144 and a neutral end 146, and phase winding 136 having an output end 148 and a neutral end 150. The output ends of phase windings 132, 134 and 136 are connected to terminals 152, 154 and 156, respectively, which terminals are adapted for connection to an alternating current load circuit.

The battery charger 10' is similar to the battery charger 10 shown in FIG. 1 except for modifications made to the rectifier means and to the switching means. Rectifier means 30' in FIG. 2 is a three-phase bridge, instead of a single-phase bridge, having input terminals 158, 160 and 162, output terminals 169 and 171, and diodes 164, 166, 168, 170, 172 and 174. Diodes 164, 166 and 168 have their cathode electrodes c connected to output terminal 169, and their anode electrodes a connected to input terminals 158, 160 and 162, respectively. Diodes 170, 172 and 174 have their cathode electrodes c connected to the input terminals 158, 160 and 162, respectively, and their anode electrodes a are connected to the output terminal 171.

The battery 12 is effectively connected in series with the alternating current load circuit connected to the alternating current generator 130, by connecting the neutral ends 142, 150 and 146 of phase windings 132, 136 and 134 to the alternating current input terminals 158, 160 and 162, respectively, via circuit breaker 190.

Switching means 50' in FIG. 2 requires an additional controlled rectifier, compared with switching means 50 in FIG. 1, having first, second and third controlled rectifiers 176, 178 and 180 which are connected from input terminals 158, 160 and 162, respectively, to junction 120. Each of the controlled rectifiers have their gate electrodes g connected to junction 94 via current dividing resistors 182, 184 and 186, respectively.

The operation of battery charger 10' from the three-phase alternating current generator 130, is the same as hereinbefore described relative to battery charger 10 in FIG. 1, with the alternating current load current flowing through the battery 12 via the rectifier 30', until sensing means 52 detects that the battery 12 is fully charged. When the battery 12 is charged, sensing means 52 provides gating signals for switching means 50', diverting the load current through the switching means 50' and away from the battery 12. This mode of operation continues until the battery terminal voltage drops to a predetermined magnitude, at which point sensing means 52 ceases to provide gating signals for the switching means 50', and the load current is again directed through the battery 12. In the event the battery 12 is disconnected from the battery charger 10' for some reason, the first protective circuit 100 provides gating pulses for switching means 50', diverting the load current through the switching means 50'. In the event of a fault in the alternating current load circuit, resulting in heavy flow through switching means 50', the second protective circuit 110 prevents sensing means 52 from providing gating signals for switching means 50', thus transferring the fault current from the switching means 50' to the battery 12.

In summary, there has been disclosed new and improved battery charger apparatus which may operate directly from a variable frequency, variable voltage source of alternating current, without requiring a separate specially regulated generator. The charging current is proportional to the alternating current system load current, and is therefore not directly affected by alternating current voltage and/or frequency fluctuations. The battery charger, connected in series with the alternating current generator circuit, has inherent protection against short circuits across its terminals, due to the constant current characteristics of the source, and a protective circuit is provided which protects the battery charger against overvoltages due to disconnection of the battery. A protective circuit is also provided which allows the selection of the switching devices in the switching means, for diverting the load current in shunt with the battery, to be made on the basis of normal load current, by switching the load current from the switching devices back to the battery in the event of excessive current flow through the switching devices. Thus, relatively small, low cost switching devices may be used in the shunting circuit. The disclosed battery charger may also be operated when the associated AC system provides a normal level of load current which is too large for charging purposes, as a transformer may be used to obtain the desired range of current.

We claim as our invention:

1. A battery charger comprising:
   a source of alternating current which may vary in output voltage and frequency,
   rectifier means, said rectifier means having alternating current input terminals and unidirectional current output terminals,
   an alternating load circuit connected in series with said source of alternating current and said rectifier means,
   a battery, said battery being connected in series with said alternating current source and said alternating current load circuit through said rectifier means, with the load current provided by said alternating current source flowing through said battery,
   sensing means connected to be responsive to the terminal voltage of said battery, providing a signal when the terminal voltage of said battery reaches a predetermined magnitude,
   switching means shunting the load current provided by said alternating current source away from said battery, in response to the signal provided by said sensing means,
   and first protective means connected across the unidirectional output terminals of the rectifier means and to the switching means, said first protective means providing switching signals for the switching means when the voltage across the unidirectional output terminals exceeds a predetermined magnitude.

2. A battery charger comprising:
   a source of alternating current which may vary in output voltage and frequency,
   rectifier means including input and output terminals,
   a battery, said battery being connected in series with said alternating current source through said rectifier means, with the load current provided by said alternating current source flowing through said battery,
   sensing means connected to be responsive to the terminal voltage of said battery, providing a signal when the terminal voltage of said battery reaches a predetermined magnitude,
   switching means including a plurality of solid state switching devices each having a control electrode connected to be responsive to the signal provided by the sensing means, said switching means shunting the load current provided by said alternating current source away from said battery, in response to the signal provided by said sensing means, and first protective means connected to the control electrodes of the solid state switching devices, and also to the output terminals of the rectifier means, said first protective means providing signals for the control electrodes of the solid state switching devices at a predetermined voltage across the output terminals of the rectifier means, when the battery is disconnected from the rectifier means.

3. The battery charger of claim 2 wherein the protective means includes a voltage regulating diode.

4. A battery charger comprising:
a source of alternating current which may vary in output voltage and frequency,
rectifier means, said rectifier means having alternating current input terminals and unidirectional current output terminals,
an alternating load circuit connected in series with said source of alternating current and said rectifier means,
a battery, said battery being connected in series with said alternating current source and said alternating current load circuit through said rectifier means, with the load current provided by said alternating current source flowing through said battery,
sensing means connected to be responsive to the terminal voltage of said battery, providing a signal when the terminal voltage of said battery reaches a predetermined magnitude,
switching means shunting the load current provided by said alternating current source away from said battery, in response to the signal provided by said sensing means,
and first and second protective means, said first protective means being connected across the unidirectional output terminals of the rectifier means and to the switching means, providing switching signals for the switching means when the voltage across the unidirectional current output terminals exceeds a predetermined magnitude, said second protective means being connected to sense the magnitude of current flowing through the switching means, and to terminate the shunting of the load current through the switching means when the current reaches a predetermined magnitude.

5. A battery charger comprising:
an alternating current source which may vary in output voltage and frequency,
an alternating current load circuit,
a battery,
a bridge rectifier having input terminals, first and second output terminals, diodes connected from the input terminals to the first output terminal, and diodes connected from the second output terminal to the input terminals,
means serially connecting said alternating current source, said load circuit, and the input terminals of said bridge rectifier,
means connecting said battery to the first and second output terminals of said bridge rectifier,
sensing means connected to be responsive to the terminal voltage of said battery, providing signals when the battery voltage exceeds a predetermined magnitude,
and a plurality of switching means, one of said switching means being connected from each input terminal of said bridge rectifier to its second output terminal, said switching means switching to their conductive states in response to signals from said sensing means, with the diodes connected to the second output terminal cooperating with the switching means connected to its associated input terminal when the switching means is conductive, to provide current paths in shunt with said battery, and with the diodes connected to the first output terminal being reverse biased by said battery to block current flow through said battery from said alternating current source,
and first protective means connected across the first and second output terminals of the bridge rectifier and to the plurality of switching means, said first protective means providing switching signals for the plurality of switching means when the voltage across the first and second output terminals of the bridge rectifier exceeds a predetermined magnitude.

6. A battery charger comprising:
an alternating current source which may vary in output voltage and frequency,
an alternating current load circuit,
a battery,
a bridge rectifier having input terminals, first and second output terminals, diodes connected from the input terminals to the first output terminal, and diodes connected from the second output terminal to the input terminals,
means serially connecting said alternating current source, said load circuit, and the input terminals of said bridge rectifier,
means connecting said battery to the first and second output terminals of said bridge rectifier,
sensing means connected to be responsive to the terminal voltage of said battery, providing signals when the battery voltage exceeds a predetermined magnitude,
a plurality of switching means, one of said switching means being connected from each input terminal of said bridge rectifier to its second output terminal, said switching means switching to their conductive states in response to signals from said sensing means, with the diodes connected to the second output terminal cooperating with the switching means connected to its a associated input terminal when the switching means is conductive, to provide current paths in shunt with said battery, and with the diodes connected to the first output terminal being reverse biased by said battery to block current flow through said battery from said alternating current source,
and first and second protective means, said first protective means being connected across the first and second output terminals of the bridge rectifier and to the plurality of switching means, providing switching signals for the plurality of switching means when the voltage across the first and second output terminals of the bridge rectifier exceeds a predetermined magnitude, said second protective means being connected to sense the magnitude of current flowing through the plurality of switching means, and to terminate the shunting of current through the plurality of switching means when the current reaches a predetermined magnitude.

* * * * *